United States Patent [19]

Kikuchi et al.

[11] Patent Number: 5,484,836
[45] Date of Patent: Jan. 16, 1996

[54] RUBBER COMPOSITION FOR TIRE TREAD

[75] Inventors: Yasushi Kikuchi; Tetsuo Ochiai; Takashi Shirokawa; Hajime Fujii, all of Hiratsuka, Japan

[73] Assignee: The Yokohama Rubber Co., Ltd., Japan

[21] Appl. No.: 301,569

[22] Filed: Sep. 7, 1994

[30] Foreign Application Priority Data

Sep. 8, 1993 [JP] Japan ................................ 5-223493

[51] Int. Cl.⁶ ..................................................... C08K 3/00
[52] U.S. Cl. ............................................ 524/495; 524/496
[58] Field of Search ..................................... 524/495, 496

[56] References Cited

U.S. PATENT DOCUMENTS 5,206,283  4/1993  Kawakami et al. ..................... 524/496

FOREIGN PATENT DOCUMENTS

| 55-12133   | 1/1980  | Japan . |
| 56-127650  | 10/1981 | Japan . |
| 57-55204   | 4/1982  | Japan . |
| 57-73030   | 5/1982  | Japan . |
| 59-2451    | 1/1984  | Japan . |
| 61-42552   | 3/1986  | Japan . |
| 61-141741  | 6/1986  | Japan . |
| 1-153740   | 6/1989  | Japan . |

OTHER PUBLICATIONS

"Carbon Blacks for Rubber Applications", Cabot Corporation (1989).

*Primary Examiner*—Edward Cain
*Attorney, Agent, or Firm*—Finnegan, Henderson, Farabow, Garrett & Dunner

[57] ABSTRACT

A rubber composition for a tire tread comprising (i) 100 parts by weight of a diene based rubber containing at least one styrene-butadiene copolymer rubber having a glass transition temperature of −60° C. to −20° C. and (ii) 20 to 75 parts by weight of carbon black having CTAB of 85 to 110 m²/g, C-DBP of more than 105 ml/100 g, $N_2SA/IA$ of more than 1.10, Tint of more than 105, ΔDst of 60 to 80 nm, and CTAB of less than 230–5.8 (dn) wherein dn is the average particle size (nm), measured by an electron microscope.

4 Claims, 1 Drawing Sheet

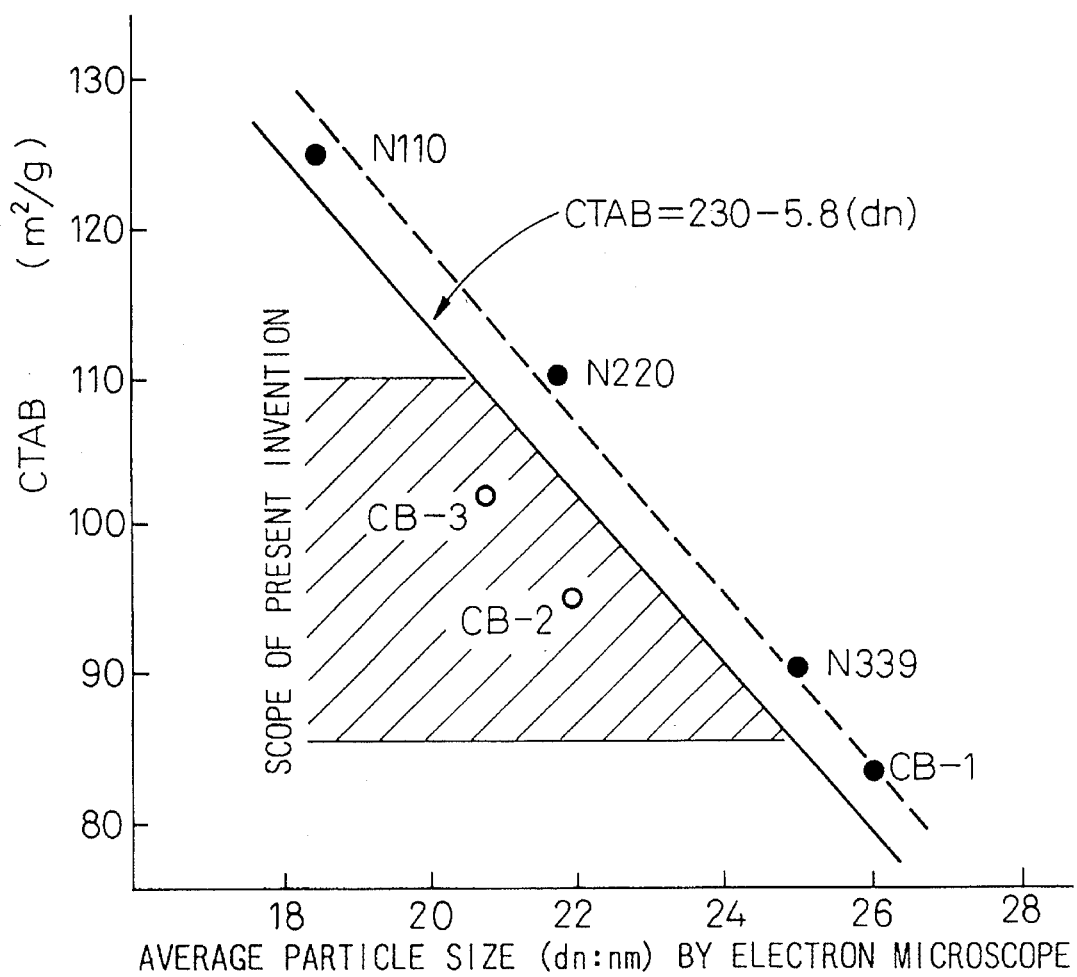

RUBBER COMPOSITION FOR TIRE TREAD

BACKGROUND OF THE INVENTION

1. Field of the Invention

The present invention relates to a rubber composition suitable for use as a low fuel consumption tire tread, more specifically it relates to a rubber composition for a low fuel consumption tire tread having the improved heat buildup and wear resistance of the tire, without impairing the wet skid resistance.

2. Description of the Related Art

To meet with social needs for resource saving and energy saving, the rubber industry, in particular the tire industry, has in recent years been engaged in active development of low fuel consumption tires. Development of such low fuel consumption tires requires development of low heat buildup rubber compositions. Recently, numerous inventions have been proposed in this field of art.

For example, Japanese Unexamined Patent Publication (Kokai) No. 55-12133 and Japanese Unexamined Patent Publication (Kokai) No. 56-127650 propose a high vinyl polybutadiene rubber (V-BR), while Japanese Unexamined Patent Publication (Kokai) No. 57-55204 and Japanese Unexamined Patent Publication (Kokai) No. 57-73030 propose high vinyl styrene-butadiene copolymer rubbers (V-SBR). It is stated in these publications that these rubbers have the effect of improvement of the grip and the heat buildup. These V-BR and V-SBR, however, have the problem of a remarkable decrease in the wear resistance. Further, Japanese Unexamined Patent Publication (Kokai) No. 61-141741, Japanese Unexamined Patent Publication (Kokai) No. 61-42552, etc. propose rubber compositions further improve in the heat buildup by modification of the V-SBR, but almost nothing is done to improve the wear resistance. The heat buildup was not sufficiently satisfied the recent needs of low heat buildup. A rubber composition having lower heat buildup and improved wear resistance is desired.

On the other hand, as a method for obtaining a rubber composition having a low heat buildup, there are generally known the method of using carbon black having a large particle size, the method of reducing the amount of the carbon black, etc., but in all of these methods, the breaking strength and wear resistance of the rubber falls, and therefore, they are not practical. Further, Japanese Examined Patent Publication (Kokoku) No. 59-2451 proposes the improvement in the heat buildup by using carbon black having a broad distribution of aggregate, but the effect of improvement cannot be said to be sufficiently practical yet and, also, the wear resistance is decreased.

As explained above, numerous proposals have been made to improve the heat buildup of rubber compositions, but no low heat buildup rubber composition which can sufficiently satisfy with the recent highly advanced needs for low fuel consumption tires has been obtained at the present time. Development of such a rubber composition is still extremely strongly desired.

SUMMARY OF THE INVENTION

Accordingly, the objects of the present invention are to eliminate these problems in the prior art and to provide a rubber composition for a low fuel consumption tire tread exhibiting the remarkably improved heat buildup and wear resistance of the tire, without impairing the wet skid resistance.

In accordance with the present invention, there is provided a rubber composition for a tire tread comprising (i) 100 parts by weight of a diene based rubber containing at least one styrene-butadiene copolymer rubber having a glass transition temperature of $-60°$ C. to $-20°$ C. and (ii) 20 to 75 parts by weight of carbon black having CTAB, measured according to the method of ASTM D3765-80 of 85 to 110 $m^2/g$, C-DBP, measured according to the method of ASTM D3493, of more than 105 ml/100 g, $N_2SA$ (i.e., nitrogen adsorption specific surface area, measured according to the method of ASTM D3037-86)/IA (i.e., iodine adsorption, measured according to JIS (Japanese Industrial Standard) K6221) of more than 1.10, Tint (using Test Methods for Carbon Black for Rubber Use set forth in item 6.1.3. of JIS K-6221-82, comparative sample of IRB#3) of more than 105, $\Delta Dst$ of 60 to 80 nm, and CTAB ($m^2/g$) of less than 230-5.8 (dn), wherein, dn is the average particle size (nm) measured by an electron microscope.

BRIEF DESCRIPTION OF THE DRAWINGS

The present invention will be better understood from the description set forth below with reference to the accompanying drawing of FIG. 1, which is a graph of the relationship between the CTAB ($m^2/g$) and average particle size (dn: nm) by an electron microscope, of the carbon black used in the Examples and Comparative Examples.

DESCRIPTION OF THE PREFERRED EMBODIMENTS

The $\Delta Dst$ is measured by the following method by the centrifugal sedimentation method using a disk centrifuge made by Joyce-Lobel Co.

That is, carbon black dried and precisely weighed by the method 5 of JIS K6221 (1982) was added to a 20% aqueous ethanol solution to give a concentration of carbon black of 0.005% by weight, then the carbon black was fully dispersed by ultrasonification. This was used as the sample. On the other hand, the disk centrifuge was set to a rotational speed of 8000 rpm, then 10 ml of a spin solution (i.e., distilled water) was added to the disk centrifuge, then 0.5 ml of a buffer solution (i.e., 20% by volume aqueous ethanol solution) was added. Next, 0.5 to 1.0 ml of the sample solution was added thereto by a syringe and the centrifugal precipitation was started. The photoelectric sedimentation method was used to prepare an aggregate distribution curve. The aggregate diameter of the most frequent value was used as the greatest frequency mode diameter Dst. The distribution value of the aggregate at the time of ½ of the greatest frequency of the curve was used as the half width $\Delta Dst$.

The rubber composition for a tire tread according to the present invention has used therein, as a first essential component, a diene based rubber such as a styrene-butadiene copolymer rubber (SBR) having a glass transition temperature (Tg) of $-60°$ C. to $-20°$ C., preferably $-55°$ to $-25°$ C. It is further preferable that the amount of rubber of a Tg of $-60°$ to $-20°$ C. mixed in the diene based rubber be at least 30% by weight, more preferably at least 40% by weight, based on the total rubber component.

As explained above, an SBR of a range of Tg of $-60°$ C. to $-20°$ C. essential as the rubber component of the rubber composition of the present invention may be those either produced by an emulsion polymerization method or produced by a solution polymerization method. When an SBR having this range of Tg is not contained, either one of the wet skid resistance, wear resistance, or heat buildup of the resultant tire is decreased, and therefore, this is not preferable. Note that, so long as the SBR has a Tg of this range, even if it is a terminal-modified SBR obtained by causing a reaction of benzophenon, isocyanate, and activated tin compound, etc. at the terminals, it may be used as the SBR of the present invention. Such a terminal-modified SBR is well known in the industry and, for example, is described in Japanese Unexamined Patent Publication (Kokai) No. 1-153740.

As diene based rubbers other than the specific SBR mixed in the rubber composition according to the present invention, mention may be made, for example, of natural rubbers, synthetic polyisoprene rubbers, polybutadiene rubbers, the other styrene-butadiene rubbers, ethylene-propylene-nonconjugated diene terpolymers (EPDM), etc. Any blend of these diene based rubbers or blends of these with other rubbers may also be used.

The rubber composition for a tire tread according to the present invention has blended therein, as a second essential component, 20 to 75 parts by weight of carbon black, preferably 30 to 70 parts by weight, based on 100 parts by weight of the rubber component, having CTAB of 85 to 110 $m^2/g$, preferably 90 to 105 $m^2/g$, C-DBP of more than 105 ml/100 g, preferably 108 to 125 ml/100 g, $N_2SA/IA$ of more than 1.10, preferably 1.10 to 1.20, Tint of more than 105, preferably 105 to 115, $\Delta Dst$ of 60 to 80 nm, preferably 65 to 77, and CTAB of less than 230−5.8 (dn), wherein dn is the average particle size (nm), measured by an electron microscope.

When the CTAB value of the carbon black used in the present invention is less than 85 $m^2/g$, the resultant tire has a low heat buildup, but sufficient wear resistance is not obtained and the wet skid resistance is also insufficient. On the other hand, when the CTAB is more than 110 $m^2/g$, the heat buildup becomes too high, which is also not preferable.

When the C-DBP value of the carbon black used in the rubber composition according to the present invention is less than 105 ml/100 g, the wear resistance of the resultant tire is decreased, and therefore, this is not preferable.

When the $N_2SA/IA$ of the carbon black is not more than 1.10, the surface activity of the carbon black becomes lower and the balance of the heat buildup and wear resistance of the resultant tire is not sufficiently improved, and therefore, this is not preferable.

When the Tint of the carbon black used in the rubber composition according to the present invention is not more than 105, it is envisioned that the distribution of the particle size of the carbon black is broad and the $\Delta Dst$ also becomes larger than the 60 to 80, defined in the present invention, and therefore, the heat buildup is good, but a sufficient wear resistance is not obtained, so this is not preferable.

When the $\Delta Dst$ value of the carbon black used in the rubber composition according to the present invention is less than 60, the wear resistance is good, but the heat buildup of the tire becomes larger, and therefore, this is not preferable. Conversely, when the $\Delta Dst$ value becomes more than 80, the heat buildup is small, but the wear resistance is decreased, and therefore, this is not preferable.

The carbon black used in the rubber composition of the present invention must have CTAB value satisfying the following equation:

CTAB<230−5.8 (dn)

The particle size of conventional carbon black, measured by an electron microscope, is almost in a relation of a primary (inclination −5.8) inverse correlation with the CTAB as shown in FIG. 1. The carbon black usable in the present invention, however, which has CTAB value of less than 230−5.8 (dn), has a small specific surface area in proportion to the dn, the aggregate shape of the carbon black is complicated, and therefore, the interaction between the carbon black and the rubber polymer is large and, as a result, the resultant tire is low in the heat buildup and excellent in the wear resistance.

The amount of the carbon black formulated into the rubber composition of the present invention is 20 to 75 parts by weight, preferably 30 to 70 parts by weight, based on 100 parts by weight of the rubber component. When the amount of intermixture of the carbon black is less than 20 parts by weight, a sufficient reinforcing property and wear resistance are not obtained, while, conversely, when more than 75 parts by weight, the wear resistance and the wet skid resistance are excellent, but the heat buildup becomes large and further the processability deteriorates, and therefore, this is not preferable.

Note that the rubber composition of the present invention may have suitably blended therein, in the range of usual blending amount, if necessary, blending agents usually used in the rubber industry, for example, carbon black, sulfur, softeners, antioxidants, vulcanization accelerators, fillers, and plasticizers. It is possible to vulcanize the composition by general methods and produce various types of rubber products.

EXAMPLES

The present invention will now be explained in detail by, but is by further using examples, but the present invention is no means limited to, the following Examples.

EXAMPLES 1 TO 8 AND COMPARATIVE EXAMPLES 1 TO 11

Using the formulation amounts (parts by weight) shown in Table 1 and Table 2, the components of 19 types of rubber compositions (Examples 1 to 8 and Comparative Examples 1 to 11)were blended and kneaded by a Banbury mixer or kneading roll machine in accordance with conventional methods. These rubber compositions were press vulcanized at 160° C. for 20 minutes to prepare test pieces. Various tests were performed and the physical properties were determined.

The results are shown in Table 1 and Table 2. Note that the test methods were as follows:
1) tanδ

An Iwamoto Seisakusho viscoelastic spectrometer was used to measure the pieces under conditions of a strain rate of 10±2% by extension deformation and a frequency of 20 Hz at 0° C. and 60° C. The values are shown as indexes using the value of Comparative Example 3 as 100. The results are shown in Table 1 and Table 2. The tanδ at 0° C. corresponds to the wet skid resistance. The larger the value, the higher the wet grip at the time of use of the tire. The tanδ at 60° C. corresponds to the heat buildup. The smaller the value, the smaller the heat buildup and the better the low fuel consumption property in the case of use for a tire.
2) Wear resistance Using a Lambourne abrasion tester, measurement was performed with a load of 2.5 kg and a slip rate of 60%. The result was shown as an index by (Amount of wear of Comparative Example 3)×100/(Amount of wear of sample).

Accordingly, the larger the value, the better the wear resistance.

TABLE 1

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Polymer | | | | | | | | | | | |
| SBR-1*[1] | 100 | 100 | 100 | 100 | 50 | - | - | - | - | - | 50 |
| SBR-2*[2] | - | - | - | - | 50 | - | - | - | - | - | 50 |
| SBR-3*[3] | - | - | - | - | - | 25 | 25 | 25 | 100 | - | - |
| SBR-4*[4] | - | - | - | - | - | 75 | 75 | - | - | - | - |
| SBR-5*[5] | - | - | - | - | - | - | - | - | - | 100 | - |
| SBR-6*[6] | - | - | - | - | - | - | - | 75 | - | - | - |
| Carbon black | | | | | | | | | | | |
| N110*[7], *[10] | 50 | - | - | - | - | - | - | - | - | - | - |
| N220*[8], *[10] | - | 50 | - | - | - | - | 40 | - | - | - | - |
| N339*[9], *[10] | - | - | 50 | - | 50 | 50 | - | 50 | - | - | - |
| CB-1*[10] | - | - | - | 50 | - | - | - | - | - | - | - |
| CB-2*[10] | - | - | - | - | - | - | - | - | 50 | 50 | 85 |
| CB-3*[10] | - | - | - | - | - | - | - | - | - | - | - |
| Zinc oxide | 3 | 3 | 3 | 3 | 3 | 3 | 3 | 3 | 3 | 3 | 3 |
| Stearic acid | 1 | 1 | 1 | 1 | 1 | 1 | 1 | 1 | 1 | 1 | 1 |
| Antioxidant*[11] | 1 | 1 | 1 | 1 | 1 | 1 | 1 | 1 | 1 | 1 | 1 |
| Aromatic oil | 5 | 5 | 5 | 5 | 5 | 5 | 5 | 5 | 5 | 5 | 5 |
| Sulfur | 1.0 | 1.0 | 1.0 | 1.0 | 1.0 | 1.0 | 1.0 | 1.0 | 1.0 | 1.0 | 1.0 |
| Vulcanizing accelerator*[12] | 1.75 | 1.75 | 1.75 | 1.75 | 1.75 | 1.75 | 1.75 | 1.75 | 1.75 | 1.75 | 1.75 |
| [Physical properties of rubber after vulcanization] | | | | | | | | | | | |
| tanδ (0°C.): Index*[3] | 111 | 110 | 100 | 92 | 103 | 107 | 101 | 106 | 87 | 153 | 117 |
| tanδ (60° C.): Index*[13] | 113 | 111 | 100 | 91 | 100 | 97 | 103 | 94 | 89 | 112 | 121 |
| Wear resistance: Index*[13] | 110 | 107 | 100 | 101 | 95 | 95 | 102 | 96 | 114 | 62 | 125 |

TABLE 2

| | Examples | | | | | | | |
|---|---|---|---|---|---|---|---|---|
| | 1 | 2 | 3 | 4 | 5 | 6 | 7 | 8 |
| Polymer | | | | | | | | |
| SBR-1*[1] | 100 | 100 | 50 | - | - | — | — | — |
| SBR-2*[2] | - | - | 50 | - | - | — | — | — |
| SBR-3*[3] | - | - | - | 25 | 25 | 25 | 25 | 50 |
| SBR-4*[4] | - | - | - | 75 | 75 | - | - | 50 |
| SBR-5*[5] | | | | | | | | |
| SBR-6*[6] | - | - | - | - | - | 75 | 75 | - |
| Carbon black | | | | | | | | |
| N110*[7], *[10] | - | - | - | - | - | - | - | - |
| N220*[8], *[10] | - | - | - | - | - | - | - | - |
| 399*[9], *[10] | - | - | - | - | - | - | - | - |
| CB-1*[10] | - | - | - | - | - | - | - | - |
| CB-2*[10] | 50 | - | 50 | 50 | - | 50 | 65 | 50 |
| CB-3*[10] | - | 50 | - | - | 40 | - | - | - |
| Zinc oxide | 3 | 3 | 3 | 3 | 3 | 3 | 3 | 3 |
| Stearic acid | 1 | 1 | 1 | 1 | 1 | 1 | 1 | 1 |
| Antiaging agent*[11] | 1 | 1 | 1 | 1 | 1 | 1 | 1 | 1 |
| Aromatic oil | 5 | 5 | 5 | 5 | 5 | 5 | 5 | 5 |
| Sulfur | 1.0 | 1.0 | 1.0 | 1.0 | 1.0 | 1.0 | 1.0 | 1.0 |
| Vulcanizing accelerator*[12] | 1.75 | 1.75 | 1.75 | 1.75 | 1.75 | 1.75 | 1.75 | 1.75 |
| [Physical properties of rubber after vulcanization] | | | | | | | | |
| tanδ (0° C.): Index*[13] | 99 | 104 | 101 | 107 | 99 | 106 | 110 | 101 |
| tanδ (60° C.): Index*[13] | 93 | 97 | 92 | 93 | 90 | 89 | 96 | 92 |
| Wear resistance: Index*[13] | 111 | 114 | 107 | 107 | 109 | 109 | 119 | 110 |

TABLE 1 and TABLE 2 Notes

TABLE 2-continued

|  | Examples | | | | | | | |
|---|---|---|---|---|---|---|---|---|
|  | 1 | 2 | 3 | 4 | 5 | 6 | 7 | 8 |

*[1]: Nipol 1502, made by Nippon Zeon, Tg = −52° C.?
*[2]: Solprene 1204, made by Nihon Elastomer, Tg = −52° C.
*[3]: Tufdene 1000, made by Asahi Chemical Industry Co., Ltd., Tg = −72° C.
*[4]: Nipol NS210, made by Nippon Zeon, Tg = −46° C.
*[5]: St/VN = 39/39, Tg = −14° C. (synthetic product)
*[6]: SBR with 4,4'-bis(diethylaminobenzophenon) made to react at the terminal of SBR-4, Tg = −46° C. (synthetic product)
*[7]: Diablack A, made by Mitsubishi Kasei Corp.
*[8]: Shoblack N220, made by Showa Cabot Co., Ltd.
*[9]: Seast KH, made by Tokai Carbon Co., Ltd.
*[10]: See Table 3.
*[11]: N-1,3-dimethylbutyl-N'-phenyl-p-phenylenediamine
*[12]: N-tert-butyl-2-benzothiazole-sulfeneamide
*[13]: Value of Comparative Example 3 used as 100.

TABLE 3

| Type of carbon black | Properties of Carbon Black Used | | | | | |
|---|---|---|---|---|---|---|
|  | N110 | N220 | N339 | CB-1 | CB-2 | CB-3 |
| CTAB (m²/g) | 125 | 110 | 90 | 83 | 95 | 102 |
| $N_2SA$ (m²/g) | 132 | 115 | 92 | 84 | 95 | 103 |
| IA (mg/g) | 141 | 117 | 88 | 67 | 84 | 87 |
| $N_2SA$/IA | 0.94 | 0.98 | 1.05 | 1.25 | 1.13 | 1.18 |
| C-DBP (ml/100 g) | 100 | 96 | 101 | 111 | 111 | 115 |
| Tint | 115 | 115 | 104 | 98 | 109 | 111 |
| ΔDst (nm) | 73 | 61 | 70 | 87 | 72 | 74 |
| dn (nm) | 18.5 | 21.8 | 25.0 | 26.0 | 22.0 | 20.8 |
| 230−5.8 (dn) | 122.7 | 103.6 | 85.0 | 79.0 | 99.5 | 109.4 |

Comparative Examples 1 to 4 are examples of the use of carbon black with one or more properties defined by the present invention out of the scope of the present invention. Either the heat buildup or the wear resistance is not sufficiently improved.

Comparative Examples 5 to 8 are examples where the rubber component used satisfies the definitions of the present invention, but the properties of the carbon black do not satisfy the definitions of the present invention. Comparative Examples 9 to 10 are examples where the properties of the carbon black satisfy the definitions of the present invention, but the rubber component does not satisfy the definitions of the present invention. In all cases, it is not possible to greatly improve the two properties of the heat buildup and the wear resistance without reducing the wet skid resistance. Comparative Example 11, further, is an example of a large amount of intermixture of carbon black, but the heat generation significantly deteriorates.

As opposed to this, Examples 1 to 8 all show a small heat buildup and a remarkably improved wear resistance without causing a reduction of the wet skid resistance, as compared with the Comparative Examples. In particular, Examples 6 and 7, which use a rubber component treated by benzophenon on the terminals, are vastly improved in the balance between the heat buildup and the wear resistance.

As explained above, when the rubber component and carbon black are blended in accordance with the present invention, it is possible to provide a rubber composition having the remarkably improved wet skid resistance, low heat buildup, and wear resistance which can be suitably used for a low fuel consumption tire tread.

We claim:

1. A rubber composition for a tire tread comprising (i) 100 parts by weight of a diene based rubber containing at least one styrene-butadiene copolymer rubber having a glass transition temperature of −60° C. to −20° C. and (ii) 20 to 75 parts by weight of carbon black having CTAB of 85 to 110 m²/g, C-DBP of more than 105 ml/100 g, $N_2SA$/IA of more than 1.10, Tint of more than 105, ΔDst of 60 to 80 nm, and CTAB of less than 230−5.8 (dn) wherein, dn is an average particle size (nm) measured by an electron microscope.

2. A rubber composition as claimed in claim 1, wherein the amount of the styrene-butadiene copolymer is 30% by weight or more of the weight of the total rubber component.

3. A rubber composition as claimed in claim 1, wherein the glass transition temperature of the styrene-butadiene copolymer is −55° C. to −25° C.

4. A rubber composition as claimed in claim 1, wherein the carbon black has CTAB of 90–105 ml/g, C-DBP of 108–125 ml/100 g, $N_2SA$/IA of 1.10–1.20 and Tint of 105–115.

* * * * *